(12) United States Patent
Sakida

(10) Patent No.: US 12,371,237 B2
(45) Date of Patent: Jul. 29, 2025

(54) POLYCRYSTALLINE SILICON LUMP, PACKAGING BODY THEREOF, AND METHOD FOR PRODUCING SAME

(71) Applicant: Tokuyama Corporation, Yamaguchi (JP)

(72) Inventor: Manabu Sakida, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 571 days.

(21) Appl. No.: 17/425,371

(22) PCT Filed: Jan. 21, 2020

(86) PCT No.: PCT/JP2020/001878
§ 371 (c)(1),
(2) Date: Jul. 23, 2021

(87) PCT Pub. No.: WO2020/153340
PCT Pub. Date: Jul. 30, 2020

(65) Prior Publication Data
US 2022/0089341 A1    Mar. 24, 2022

(30) Foreign Application Priority Data
Jan. 25, 2019   (JP) ................. 2019-011049

(51) Int. Cl.
*B65D 65/42*    (2006.01)
*B65D 81/18*    (2006.01)
*C01B 33/02*    (2006.01)

(52) U.S. Cl.
CPC ............. *B65D 65/42* (2013.01); *B65D 81/18* (2013.01); *C01B 33/02* (2013.01); *C01P 2006/80* (2013.01)

(58) Field of Classification Search
None
See application file for complete search history.

(56) References Cited

U.S. PATENT DOCUMENTS

| | | |
|---|---|---|
| 5,346,557 A | 9/1994 | Ito et al. |
| 5,445,679 A | 8/1995 | Hansen et al. |
| 9,073,756 B2 | 7/2015 | Wochner et al. |
| 9,266,741 B2 | 2/2016 | Wochner et al. |
| 9,988,188 B2 | 6/2018 | Sasaki |
| 1,142,685 A1 | 8/2022 | Namekawa |
| 2013/0189176 A1* | 7/2013 | Wochner ............... C01B 33/037 423/348 |
| 2014/0165503 A1* | 6/2014 | Vietz ...................... B65B 25/00 383/109 |
| 2017/0073235 A1 | 3/2017 | Miyao et al. |
| 2017/0233174 A1* | 8/2017 | Yoshimura ............. B65B 29/00 53/459 |
| 2017/0342595 A1 | 11/2017 | Miyao et al. |
| 2019/0391126 A1 | 12/2019 | Namekawa et al. |

FOREIGN PATENT DOCUMENTS

| | | | | |
|---|---|---|---|---|
| CN | 101974785 A | * | 6/2011 | |
| CN | 103213988 A | | 7/2013 | |
| CN | 104445208 A | | 3/2015 | |
| DE | 102012218748 A1 | * | 12/2012 | ........... C01B 33/037 |
| JP | H05121390 A | | 5/1993 | |
| JP | 2561015 Y2 | * | 1/1998 | |
| JP | 2834600 B2 | * | 12/1998 | |
| JP | 2000128692 A | | 5/2000 | |
| JP | 2006089353 A | | 4/2006 | |
| JP | 2009298672 A | | 12/2009 | |
| JP | 2010036981 A | | 2/2010 | |
| JP | 2013151413 A | | 8/2013 | |
| JP | 2014031309 A | | 2/2014 | |
| JP | 2015113252 A | | 6/2015 | |
| JP | 2016005993 A | | 1/2016 | |
| JP | 2016056066 A | | 4/2016 | |
| JP | 2018021852 A | | 2/2018 | |
| JP | 2018090427 A | | 6/2018 | |
| JP | 2019151406 A | | 9/2019 | |
| WO | 2016038779 A1 | | 3/2016 | |
| WO | 2018110653 A | | 6/2018 | |
| WO | 20181106531 A1 | | 6/2018 | |

OTHER PUBLICATIONS

Machine Translation for Oda (Year: 1998).*
Machine Translation for JP 2561015 Y2 (Year: 1998).*
Machine Translation DE-102012218748 (Year: 2012).*
Translation for CN-101974785-A (Year: 2011).*
English Abstract for WO2018110653, Jun. 21, 2018.
English Abstract for JP2006089353 A, Apr. 6, 2006.
English Abstract for JP2010036981 A, Feb. 18, 2010.
English Abstract for JP2013151413 A, Aug. 8, 2013.
English Abstract for JP2015113252 A, Jun. 22, 2015.
English Abstract for JP2016005993 A, Jan. 14, 2016.
English Abstract for JP2014031309A, Feb. 20, 2014.
English Abstract for JP2019151406A, Sep. 12, 2019.
English Abstract for JP2009298672A, Dec. 24, 2009.
English Abstract for JPH05121390A, May 18, 1993.
English Abstract for WO2018110653 A1, Jun. 21, 2018.
English Abstract for WO2016038779 A1, Mar. 17, 2016.
Extended European Search Report, dated Aug. 30, 2022.

(Continued)

*Primary Examiner* — Michael Forrest
(74) *Attorney, Agent, or Firm* — CAHN & SAMUELS, LLP

(57) ABSTRACT

A polycrystalline silicon lump packaging body is a packaging body in which the resin bag is filled with the polycrystalline silicon lumps having a surface metal concentration of 1000 pptw or less, in which a nitrate ion amount and preferably a fluorine ion amount present inside the packaging body are each 50 μg/L or less with respect to a filling void of the polycrystalline silicon lumps formed when the packaging body is left at 25° C. under 1 atm.

11 Claims, No Drawings

(56) References Cited

OTHER PUBLICATIONS

English Abstract of CN103213988A, Jul. 24, 2013.
English Abstract for JP2000128692 A, May 9, 2000.
English Abstract for CN104445208 A, Mar. 25, 2015.
Search Report and Written Opinion from Singapore Intellectual Property Office, dated Nov. 18, 2022, 10 pages.
International Preliminary on Patentability, dated Jul. 29, 2021.
English Abstract for JP2016056066 A, Apr. 21, 2016.
English Abstract for JP2018090427 A, Jun. 14, 2018.
English Abstract of JP2018021852A, Feb. 8, 2018.

* cited by examiner

POLYCRYSTALLINE SILICON LUMP, PACKAGING BODY THEREOF, AND METHOD FOR PRODUCING SAME

This application is a U.S. national stage application of PCT/JP2020/001878 filed on 21 Jan. 2020 and claims priority to Japanese patent document 2019-011049 filed on 25 Jan. 2019, the entireties of which are incorporated herein by reference.

TECHNICAL FIELD

The present invention relates to a polycrystalline silicon lump, a packaging body thereof, and methods for producing the polycrystalline silicon lump and the packaging body.

BACKGROUND OF THE INVENTION

A high density integrated electronic circuit requires a high purity single crystal silicon wafer. The single crystal silicon wafer is obtained by slicing a single crystal silicon rod produced by the Czochralski method (CZ method). Polycrystalline silicon, also called polysilicon, is used as a raw material for producing the single crystal silicon rod by the CZ method.

The Siemens method is known as a method for producing the polycrystalline silicon. In the Siemens method, a silicon core wire disposed inside a bell jar type reaction vessel is heated to a silicon precipitation temperature by energization, a silane compound gas such as trichlorosilane ($SiHCl_3$) or monosilane ($SiH_4$) and hydrogen are supplied to the reaction vessel, and the polycrystalline silicon is precipitated on the silicon core wire by a chemical vapor deposition method, thereby obtaining a high purity polycrystalline silicon rod.

The obtained polycrystalline silicon rod is cut or crushed into a size that is easy to handle as the raw material for producing the single crystal silicon by the CZ method. Specifically, the polycrystalline silicon rod is cut or crushed with a cutting tool or a crushing tool made of a hard metal to obtain polycrystalline silicon lumps (cut rod, crushed product). Here, since the hard metal constituting the cutting tool or the crushing tool is usually a tungsten carbide/cobalt alloy (WC/Co alloy), a surface of the polycrystalline silicon lumps is contaminated with tungsten or cobalt. In addition, the surface of the polycrystalline silicon lumps is contaminated with various other metal impurities by contact with various metal tools such as a transfer device and a classifier. Then, these metal impurities, even in small amounts, cause defects in the single crystal silicon wafer used in the high density integrated electronic circuit, which ultimately deteriorates a device performance and limits a circuit density.

Therefore, it is necessary to reduce a concentration of the metal impurities on the surface of the polycrystalline silicon lumps as much as possible, and the metal impurities are removed by acid cleaning. Specifically, an etching treatment with an aqueous solution of nitrohydrofluoric acid is performed. Here, hydrofluoric acid has effects of satisfactorily dissolving an oxide film formed on the surface of the crushed polycrystalline silicon lumps, and also dissolving various metals and oxides thereof adhering to the oxide film. In addition nitric acid exerts effects of oxidizing the polycrystalline silicon to form an oxide film on the surface of the crushed polycrystalline silicon lumps, and promoting dissolution and removal of the oxide film by the hydrofluoric acid.

The polycrystalline silicon lumps whose surface is cleaned in this manner are subjected to a water-washing step and a drying step, and filled in a resin bag and stored in a form of a packaging body in order to prevent recontamination of the lump surface, and then is transported and shipped to a factory for producing the single crystal silicon rod and the like. In this case, one of problems that occur in the polycrystalline silicon lump filled in the packaging body is occurrence of stains on the surface (see Patent Literature 1). In particular, when the polycrystalline silicon lump is stored in the packaging body for a long period of time, or is exposed to a high temperature and high humidity environment during transportation (severely, a temperature of 50° C. or higher and a humidity of 70% or higher), the problem of numerous stains on the surface of the filled polycrystalline silicon lump has become apparent.

Here, the stains occur due to abnormal growth of the oxide film on the surface of the polycrystalline silicon. When a polycrystalline silicon lump with stains is used as the raw material for growing the single crystal silicon, defects occur in the cut-out silicon wafer, causing quality deterioration. It is considered that a reason why the stains occur is that acid solution components (fluorine ions and nitrate ions) used in the acid cleaning step permeate into cracks and fissures on the surface of the lump and remain therein. That is, these acid solution components that have permeated deeply into the cracks and fissures cannot be sufficiently removed even if the polycrystalline silicon lump is water-washed, and it is presumed that these residual acid solution components combine with oxygen contained in an internal air of the packaging body during storage in the packaging body to cause the stains.

Therefore, in Patent Literature 1, in order to reduce a residual fluorine component due to insufficient draining, it is proposed that the polycrystalline silicon lump is acid-cleaned, dried, and then held under reduced pressure at a temperature of 45° C. or higher for a certain period of time. However, it is explained that an effect of reducing the fluorine component is saturated at a heating temperature of 60° C. or higher, and 70° C. or lower is preferred due to a problem of an increase in heating cost (see paragraph [0025]). No temperature condition is shown in a drying step in a previous stage.

In Patent Literature 2, attempts have been made to remove the acid solution components by holding the polycrystalline silicon lump after the acid cleaning in pure water vapor and cleaning the lump with condensed water generated on the surface thereof. However, even in this case, even if the pure water vapor has a high temperature, it is the condensed water that cleans the acid solution components, and a temperature of the condensed water is merely below 100° C.

CITATION LIST

Patent Literature

Patent Literature 1: JP-A-2009-298672
Patent Literature 2: JP-A-H05-121390

SUMMARY OF INVENTION

Technical Problem

By applying these methods for removing the acid solution components in the related art, the acid solution components adhering to the surface of the polycrystalline silicon lump after the acid cleaning can be removed fairly well. In particular, as shown in Patent Literature 1, removability of the fluorine component is stably high, and even those that have permeated into the cracks and fissures can be considerably removed. As a result, stain occurrence prevention is achieved to some extent in the polycrystalline silicon lump obtained.

However, in a case that the polycrystalline silicon lump in the packaging body filled in the resin bag is stored for a long period of time and is exposed to a high temperature and high humidity environment during transportation, an improvement effect thereof cannot be said to be sufficient. In particular, with an increase in density of the integrated electronic circuit in recent years, a demand for defect prevention for the single crystal silicon wafer is increasing. It is strongly desired that the occurrence of the stains on the raw material polycrystalline silicon lump is highly prevented even if the packaging body is left in a harsh environment.

Solution to Problem

In view of the above problem, the present inventors have intensively studied. As a result, it is found that in the form of a packaging body of the polycrystalline silicon lumps that has been subjected to acid-cleaning with an aqueous solution of nitrohydrofluoric acid, occurrence of stains cannot be completely prevented, and the occurrence of stains is particularly remarkable when the packaging body is left in a harsh environment, and it is caused by insufficient removal of nitrate ions in residual acid solution components derived from the acid cleaning solution. Then, based on this finding, the present inventors have found that what directly influences the occurrence of the stains is a concentration of the nitrate ions with respect to a filling void of the polycrystalline silicon lump in the form of the packaging body. Thus, the present invention has been completed.

That is, the present invention provides a packaging body in which a resin bag is filled with polycrystalline silicon lumps having a surface metal concentration of 1000 pptw or less, and a nitrate ion amount present inside the packaging body is 50 μg/L or less with respect to a filling void of the polycrystalline silicon lumps formed when the packaging body is left at 25° C. under 1 atm.

The present invention also provides a polycrystalline silicon lump having a surface metal concentration of 1000 pptw or less and a surface nitrate ion amount of $1.0 \times 10^{-4}$ μg/mm$^2$ or less. The polycrystalline silicon lump can be advantageously used to obtain the polycrystalline silicon lump packaging body by being filled into the resin bag.

Further, the present invention also provides, as a method for producing the above-mentioned polycrystalline silicon lump, a method of drying a polycrystalline silicon lump cleaned body acid-cleaned with an aqueous solution of nitrohydrofluoric acid at a heating temperature of 100° C. or higher.

Furthermore, the present invention also provides a method for producing the polycrystalline silicon lump packaging body, including: when packing the polycrystalline silicon lumps obtained by the above method in the resin bag, filling the resin bag at a filling amount such that the nitrate ion amount present inside the packaging body is 50 μg/L or less with respect to the filling void of the polycrystalline silicon lumps formed when the packaging body is left at 25° C. under 1 atm.

Advantageous Effects of Invention

In the polycrystalline silicon lump packaging body of the present invention, stains are less likely to occur on the surface of the polycrystalline silicon lumps filled inside. In particular, even if the packaging body is stored for a long period of time and left in a harsh environment such as being exposed to a high temperature and high humidity environment during transportation, the occurrence of the stains on the polycrystalline silicon lumps is highly prevented. Therefore, when this polycrystalline silicon lumps are used as a raw material for growing single crystal silicon, it is possible to effectively prevent occurrence of defects in a cut-out silicon wafer, which is extremely significant in industry.

DESCRIPTION OF EMBODIMENTS

In a polycrystalline silicon lump packaging body of the present invention, polycrystalline silicon lumps filled in a resin bag are lumps obtained by cutting or crushing a polycrystalline silicon rod into a size that is easy to handle for use as a raw material for producing single crystal silicon by the CZ method and the like, and corresponds to a so-called cut rod or crushed product. A method for producing the polycrystalline silicon rod is not limited, but usually, a rod produced by the Siemens method is used. Here, the Simens method is a method of vapor deposition (precipitation) of polycrystalline silicon on a surface of a heated silicon core wire by a chemical vapor deposition (CVD) method by bringing a silane raw material gas such as trichlorosilane or monosilane into contact with the heated silicon core wire.

The polycrystalline silicon rod thus obtained is substantially cylindrical, and a diameter thereof is not particularly limited, is usually 80 mm to 150 mm. A length of the polycrystalline silicon rod is also not particularly limited, and is usually 1000 mm or more.

When the polycrystalline silicon lump is a cut rod, the polycrystalline silicon rod is cut to a predetermined length with a cutting tool to obtain a cylindrical body.

On the other hand, when the polycrystalline silicon lump is a crushed product, the polycrystalline silicon rod and the cut rod obtained from the polycrystalline silicon rod are crushed by a crushing tool. This crushing is performed using a hammer whose striking portion is made of a hard metal such as a WC/Co alloy, a jaw crusher, or the like, and if necessary, the crushed product may be sorted into a desired size by a classification device such as a sieve or a step deck. The size of the crushed product is preferable such that at least 90 mass % of the crushed product has a major axis length in a range of 2 mm to 160 mm. In this range, the crushed product is generally divided according to a particle size, and specifically, the crushed product is divided into those having a major axis length in a range of 90 mm to 160 mm in an amount of at least 90 mass %, those having a major axis length in a range of 10 mm to 120 mm in an amount of at least 90 mass %, those having a major axis length in a range of 10 mm to 60 mm in an amount of at least 90 mass %, or those having a major axis length in a range of 2 mm to 10 mm in an amount of at least 90 mass %.

A surface of the polycrystalline silicon lumps obtained by cutting or crushing in this way is contaminated with tungsten or cobalt due to the cutting tool or crushing tool that comes into contact at this time, and are further contaminated by various other metal impurities by contact with various metal tools such as a transfer device and the classification device. Therefore, since it is necessary to reduce such metal impurities as much as possible in the single crystal silicon wafer application as described above, the polycrystalline silicon lump is subjected to acid cleaning to etch the surface. In order to etch the surface of the polycrystalline silicon lump in this way, it is necessary to use an aqueous solution of nitric acid as an acid cleaning solution. Furthermore, it is preferable to also dissolve and remove an oxide film formed on the surface of the crushed polycrystalline silicon lump. Since an aqueous solution of nitrohydrofluoric acid has these effects, it is more preferable to use the aqueous solution of nitrohydrofluoric acid.

In the aqueous solution of nitrohydrofluoric acid, an optimum blending ratio of each component may be appropriately determined depending on a state of the polycrystalline silicon lump, pretreatment conditions, and the like, and the blending ratio is preferably as follows. Specifically, it is preferable that hydrogen fluoride is contained in an amount of 1 to 20 parts by mass and nitric acid is contained in an amount of 150 to 250 parts by mass, with respect to 100 parts by mass of water. The amount of hydrogen fluoride is more preferably 1.5 to 15 parts by mass, and is still more preferably 4 to 6 parts by mass. Further, among such a blending ratio, a mass ratio of nitric acid to hydrogen fluoride (mass of nitric acid/mass of hydrogen fluoride) is preferably 10 to 170.

A surface metal concentration of the polycrystalline silicon lump is reduced to 1000 pptw or less, preferably 100 pptw or less, and more preferably 80 pptw or less by the acid cleaning using the aqueous solution of nitrohydrofluoric acid. A lower limit of the surface metal concentration is ideally 0 (zero), but is usually 10 pptw or more, preferably 30 pptw or more. Here, target elements for the surface metal concentration of the polycrystalline silicon lump are 14 elements, Na, Mg, Al, K, Ca, Cr, Fe, Ni, Co, Cu, Zn, W, Ti and Mo, and are represented by a total amount thereof.

In the present invention, the surface metal concentration of the crushed polycrystalline silicon lump is a value showing a mass of each metal contained in the polycrystalline silicon lump as a content per mass (pptw) of the polycrystalline silicon lump, and is measured by the following method. That is, in metal concentration analysis of the surface of the polycrystalline silicon lump to be measured, the surface of the polycrystalline silicon lump is etched, and each metal element in an obtained sample solution is subjected to inductively coupled plasma mass spectrometry (ICP-MS) to be analytically quantified. Specifically, if the polycrystalline silicon lump is a crushed product, approximately 40 g of the crushed product is transferred to a 500 ml clean polytetrafluoroethylene beaker and 100 ml of a dissolution (50 mass %-HF: 10 ml, 70 mass %-nitric acid: 90 ml) is added, and extraction is performed at 25° C. for 30 minutes. A liquid content in the beaker and a cleaning solution obtained by cleaning the surface of the polycrystalline silicon crushed product with 100 ml of ultrapure water are transferred to a clean polytetrafluoroethylene beaker to prepare a surface extract of the polycrystalline silicon crushed product. Then, this surface extract is evaporated to dryness, and a 3.5 mass %-nitric acid aqueous solution is added to a residue to make a volume of 20.0 ml, and the ICP-MS measurement is performed, so that each surface metal mass of Na, Mg, Al, K, Ca, Cr, Fe, Ni, Co, Cu, Zn, W, Ti, and Mo is measured. The surface metal concentration of the polycrystalline silicon crushed product is a content per unit weight (pptw) of the polycrystalline silicon crushed product obtained by dividing a measured value of each surface metal mass by a mass of the crushed product (approximately 40 g).

Even if the polycrystalline silicon lump is acid-cleaned in this way to reduce the surface metal concentration, the single crystal silicon produced from this polycrystalline silicon lump as the raw material cannot sufficiently prevent the occurrence of defects in the cut-out silicon wafer as described above. One of major causes is occurrence of stains due to acid solution components remaining after the acid cleaning. This cannot be highly prevented as described above even if a heat treatment at a relatively low temperature or cleaning with condensed water in the related art is performed. This is because a considerable amount of nitrate ions remain on the surface of the lump during the heat treatment at the low temperature or the cleaning with condensed water. When the polycrystalline silicon lumps are packed in a bag, the nitrate ions are dispersed and concentrated in the sealed bag, resulting in a high concentration in the filling void, and are contained in dew condensation that occurs when a temperature inside the packaging body changes and reattach to the polycrystalline silicon lump, forming an oxide film on the surface of the polycrystalline silicon lump.

In this respect, in the present invention, by using the polycrystalline silicon lumps having a highly reduced surface nitrate ion amount and filling them into the resin bag with sufficient filling void, the polycrystalline silicon lump packaging body having an extremely low nitrate ion concentration with respect to the filling void during storage is obtained. Specifically, the nitrate ion amount present inside the packaging body is reduced to 50 μg/L or less with respect to the filling void of the polycrystalline silicon lumps formed when the packaging body is left at 25° C. under 1 atm. With this low nitrate ion amount, a reaction of forming the oxide film that causes stains on the surface of the polycrystalline silicon lump is remarkably reduced. It is also possible to obtain a polycrystalline silicon lump having a low nitrate ion amount of 5 μg/L or less with respect to the filling void. A lower limit of such a nitrate ion amount with respect to the filling void is ideally 0 μg/L, and is usually 1 μg/L, more preferably 2 μg/L. Here, when the nitrate ion amount with respect to the filling void exceeds 50 μg/L, the stains remarkably occur in storage of the packaging body for a long time or in a high temperature and high humidity environment.

In the present invention, the nitrate ion amount and a fluorine ion amount present inside the packaging body can be determined by the following method. That is, at 25° C. under 1 atm, the polycrystalline silicon lump packaging body filled with the polycrystalline silicon lumps is sealed after being added with a sufficient amount of ultrapure water at 25° C. to immerse the surface of the polycrystalline silicon lump, so as to elute a nitric acid component and a fluorine component. The amount of the pure water is generally 20 mL or more, and more preferably 30 mL to 60 mL per volume (L) of the resin bag. For example, in a case of a packaging body filled in a resin bag having a volume of approximately 3 L, which is a typical size of the polycrystalline silicon lump packaging body, it is desirable to add 100 mL of the pure water. When the water amount is excess, concentrations of the acid solution components in elution water decrease, and measurement sensitivity of an ion chromatograph decreases.

The polycrystalline silicon lump packaging body added with the ultrapure water is stirred or shaken for 5 minutes to elute the nitric acid component and the fluorine component inside the packaging body into ultrapure water. This elution water is collected, and the nitrate ion amount and the fluorine ion amount (μg) are measured by ion chromatography. Then, the amount (μg/L) of each kind of ion with respect to the filling void is obtained by dividing the nitrate ion amount and the fluorine ion amount by a filling void volume of the polycrystalline silicon lump packaging body.

In the present invention, the filling void volume (L) of the polycrystalline silicon lump packaging body can be obtained by calculating a volume of the polycrystalline silicon lump by dividing the weight of the filled polycrystalline silicon lump by a density of polycrystalline silicon of 2330 kg/m$^3$, and then subtracting the volume of the polycrystalline silicon lump from an internal volume (L) of the resin bag forming the packaging body at 25° C. under 1 atm.

In the present invention, in order to further improve an effect of preventing the occurrence of the stains, the fluorine ion amount present inside the packaging body is preferably as low as 50 µg/L or less, and is particularly preferably as low as 30 µg/L or less with respect to the filling void of the polycrystalline silicon lump formed when the packaging body is left at 25° C. under 1 atm. A lower limit of the fluorine ion amount with respect to the filling void is ideally 0 µg/L, but since it is difficult to attain extremely low fluorine ion amount, the lower limit of the fluorine ion amount is usually 15 µg/L, and more preferably 20 µg/L.

In such a polycrystalline silicon lump packaging body, a filling void rate of the resin bag is preferably 40% to 70%. When the filling void rate is less than 40%, it becomes difficult to adjust the nitrate ion amount with respect to the filling void within the above range. Meanwhile, when the filling void rate is larger than 70%, a filling amount of the polycrystalline silicon lump into the bag is reduced, and efficiency of the storage or the transportation is lowered.

For the same reason, a total amount of the nitrate ion and the fluorine ion present inside the packaging body is more preferably as low as 100 µg/L or less, and particularly preferably as low as 70 µg/L or less with respect to the filling void of the polycrystalline silicon lump formed when the packaging body is left at 25° C. under 1 atm. A lower limit of the total amount of the nitrate ions and the fluorine ions with respect to the filling void is ideally 0 µg/L, and since it is difficult to attain extremely low total amount of the nitrate ion and the fluorine ion, the lower limit of the total amount of the nitrate ion and the fluorine ion is usually 16 µg/L, and more preferably 22 µg/L.

In addition to having a surface metal concentration of 1000 pptw or less, the polycrystalline silicon lump filled in the packaging body in this manner preferably has a surface nitrate ion amount as low as $1.0 \times 10^{-4}$ µg/mm$^2$ or less, and more preferably as low as $1.0 \times 10^{-5}$ µg/mm$^2$ or less. A lower limit of the surface nitrate ion amount of the polycrystalline silicon lump filled in this packaging body is ideally 0 µg/mm$^2$, and is usually $1.0 \times 10^{-6}$ µg/mm$^2$, and more preferably $2.0 \times 10^{-6}$ µg/mm$^2$.

A surface fluorine ion amount is preferably $1.0 \times 10^{-4}$ µg/mm$^2$ or less, and more preferably as low as $6.0 \times 10^{-5}$ µg/mm$^2$ or less. A lower limit of the surface fluorine ion amount of the polycrystalline silicon lump filled in this packaging body is ideally 0 µg/mm$^2$, and is usually $3.0 \times 10^{-5}$ µg/mm$^2$, and more preferably $4.0 \times 10^{-5}$ µg/mm$^2$.

A total amount of the surface nitrate ion and the surface fluorine ion is preferably $2.0 \times 10^{-4}$ µg/mm$^2$ or less, and more preferably as low as $7.0 \times 10^{-5}$ µg/mm$^2$ or less. A lower limit of the total amount of the surface nitrate ion and the surface fluorine ion of the polycrystalline silicon lump filled in this packaging body is ideally 0 µg/mm$^2$, and is usually $3.1 \times 10^{-5}$ µg/mm$^2$, and more preferably $4.2 \times 10^{-5}$ µg/mm$^2$.

Here, the surface nitrate ion amount and the surface fluorine ion amount in the polycrystalline silicon lump can be obtained by the following method. That is, a resin bag having a volume of approximately 3 L is filled with approximately 5 kg of the polycrystalline silicon lump to obtain a polycrystalline silicon lump packaging body for surface concentration measurement. At 25° C. under 1 atm, this polycrystalline silicon lump packaging body for surface concentration measurement is added with 100 mL of ultrapure water having the same temperature and then stirred or shaken for 5 minutes to elute the nitric acid component and the fluorine component inside the packaging body into ultrapure water. This elution water is collected, and the nitrate ion amount and the fluorine ion amount (µg) are measured by the ion chromatography. Then, by dividing the nitrate ion amount and the fluorine ion amount by a surface area S (mm$^2$) of the polycrystalline silicon lump used for the measurement, the amount of each of these ions per unit surface area can be obtained.

In the present invention, the surface area S (mm$^2$) of the polycrystalline silicon lump is determined by the following method. That is, an average weight W (g) per one polycrystalline silicon lump is obtained by measuring a total number A of the polycrystalline silicon lumps packed in the resin bag and then dividing the total weight by the total number A. The surface area S can be calculated by the following mathematical formula in terms of cubes from the average weight W (g), a density of polycrystalline silicon $\rho = 2330$ kg/m$^3$, and the total number A.

$$S(\text{mm}^2) = W/\rho^{(2/3)} \times 6 \times A \times 100 (\text{mm}^2/\text{cm}^2)$$

A resin material such as polyethylene, polypropylene, polyvinyl chloride, or nylon can be used for the resin bag. As a shape thereof, a shape such as a flat bag or a gusset bag is generally adopted, and a double bag structure in which the bag is doubled is preferably used. In order to prevent breakage or rubbing between the polycrystalline silicon lump and a packaging material, it is also preferable to reduce pressure or evacuate an inside of the packaging body.

Next, a method for producing the polycrystalline silicon lump packaging body of the present invention will be described. In the polycrystalline silicon lump packaging body of the present invention, as long as the nitrate ion amount with respect to the filling void is low when the resin bag is filled with the polycrystalline silicon lumps having a surface metal concentration of 1000 pptw or less, the method for producing the packaging body is not limited. Preferably, the packaging body can be produced by drying a polycrystalline silicon lump cleaned body acid-cleaned with the aqueous solution of nitrohydrofluoric acid at a heating temperature of 100° C. or higher.

An acid cleaning step with the aqueous solution of nitrohydrofluoric acid is as described above. The cleaning may be carried out by putting the polycrystalline silicon lumps into a cage made of a resin having excellent chemical resistance and immersing the cage in the aqueous solution of nitrohydrofluoric acid in a cleaning tank. As the resin used as a material of the cage, for example, polypropylene, polyethylene, polytetrafluoroethylene (PTFE), and polyvinylidene fluoride (PVDF) may be used. One or a plurality of cleaning tanks may be provided.

The polycrystalline silicon lump cleaned body acid-cleaned with the aqueous solution of nitrohydrofluoric acid is preferably water-washed and dried. The water-washing is performed to remove an etching solution adhering to the surface of the polycrystalline silicon lump, but residual acid solution components, especially the nitric acid component, that have permeated into cracks and fissures cannot be sufficiently removed.

As the water used for the water-washing, it is preferable to use ultrapure water from the viewpoint of low metallic foreign substances. One or a plurality of water-washing tanks may be provided. In order to increase drying efficiency in a subsequent drying step, it is more preferable to control the temperature of at least a final water-washing tank to 60° C. or higher, more preferably 80° C. or higher, and to raise the temperature of the polycrystalline silicon lump.

In this way, the polycrystalline silicon lump cleaned body acid-cleaned with the aqueous solution of nitrohydrofluoric acid is dried at a heating temperature of 100° C. or higher. Since the temperature of a blowing gas for contact in the drying is as high as 100° C. or higher, the polycrystalline silicon lump cleaned body to which the gas is blown is also heated to the same temperature. As a result, in the residual components of the aqueous solution of nitrohydrofluoric acid adhering to the polycrystalline silicon lump cleaned body, not only the fluorine ion but also the nitrate ion can be volatilized at a high rate, and these acid solution components that have permeated into the cracks and fissures can be highly removed. By filling the resin bag with the dried polycrystalline silicon lump, it is possible to obtain a polycrystalline silicon lump packaging body having an extremely low nitrate ion amount with respect to the filling void.

Here, since the aqueous solution of nitrohydrofluoric acid is azeotropic at a temperature of 120° C. when nitric acid concentration is 68 mass %, the heating temperature is preferably 120° C. or higher. In addition, when the heating temperature is too high, deterioration of resin members inside an apparatus is increased, so the temperature is preferably 150° C. or lower.

The gas supplied for drying is usually air, or may be an inert gas such as nitrogen or argon. These supplied gases are used as clean as possible, and preferably those having a cleanliness of Class 100 or less are used.

A drying time may be appropriately set such that the desired nitrate ion amount is achieved considering an amount of the acid solution components adhering to the surface of the polycrystalline silicon lump, the size of the polycrystalline silicon lump, the temperature of the supplied gas, a velocity of the supplied gas, and the like. Generally, the drying time may be set to 10 minutes to 120 minutes, and more preferably 30 minutes to 60 minutes.

The drying may be carried out by transferring the polycrystalline silicon lumps cleaned body to a cage for drying and accommodating the cage in a dryer. However, since there is a risk of new contamination due to this transfer operation, the steps from the acid cleaning with the aqueous solution of nitrohydrofluoric acid to the drying may be continued as in the resin cage used for the cleaning. From the viewpoint of energy efficiency, it is preferable that exhausted gas from the dryer is reheated as necessary and circulated for the drying.

The resin bag may be filled with the polycrystalline silicon lumps thus dried as described above to obtain the polycrystalline silicon lump packaging body of the present invention. The filling may be performed manually or using a filling device. After filling the resin bag, an opening may be sealed with a heat sealer or the like.

EXAMPLES

Hereinafter, the present invention will be described in more detail by Examples, but the present invention is not limited to these Examples. In Examples and Comparative Examples, each physical property value and evaluation were obtained by the following methods.

1) Method for Measuring Surface Nitrate Ion Amount and Surface Fluorine Ion Amount of Polycrystalline Silicon Lump At 25° C. under 1 atm, polycrystalline silicon lump packaging bodies (resin bags each having a volume of 3.5 L filled with approximately 5 kg of the polycrystalline silicon lump) produced in Examples and Comparative Examples were added with 100 mL of ultrapure water having the same temperature and then stirred or shaken for 5 minutes to elute the nitric acid component and the fluorine component inside the packaging bodies into ultrapure water.

This elution water was collected, and the nitrate ion amount and the fluorine ion amount (µg) were measured by the ion chromatography. Then, by dividing the nitrate ion amount and the fluorine ion amount by the surface area S ($mm^2$) of the polycrystalline silicon lump used for measurement, the amount of each ions per unit surface area was obtained.

2) Method for Measuring Surface Metal Concentration of Polycrystalline Silicon Lump Approximately 40 g of the polycrystalline silicon lump was transferred to a 500 ml clean polytetrafluoroethylene beaker and 100 ml of a dissolution (50 mass %-HF: 10 ml, 70 mass %-nitric acid: 90 ml) was added and extraction was performed at 25° C. for 15 minutes. The liquid content in the beaker and a cleaning solution obtained by cleaning the surface of the polycrystalline silicon lumps with 100 ml of ultrapure water were transferred to the clean polytetrafluoroethylene beaker to prepare a surface extract of the polycrystalline silicon lump. Then, this surface extract was evaporated to dryness, and a 3.5 mass %-nitric acid aqueous solution was added to the residue to make a volume of 20.0 ml, and the ICP-MS measurement was performed such that each surface metal mass of Na, Mg, Al, K, Ca, Cr, Fe, Ni, Co, Cu, Zn, W, Ti, and Mo is measured. The surface metal concentration of the polycrystalline silicon lump was the content per unit weight (pptw) of the polycrystalline silicon lump obtained by dividing the measured value of each surface metal mass by the mass of the polycrystalline silicon lump (approximately 40 g).

3) Method for Measuring Nitrate Ion Amount and Fluorine Ion Amount Present Inside Polycrystalline Silicon Lump Packaging Body At 25° C. under 1 atm, the polycrystalline silicon lump packaging bodies (resin bags each having a volume of 3.5 L filled with approximately 5 kg of the polycrystalline silicon lump) produced in Examples and Comparative Examples were added with 100 mL of ultrapure water having the same temperature and then stirred or shaken for 5 minutes to elute the nitric acid component and the fluorine component inside the packaging bodies into the water. This elution water was collected, and the nitrate ion amount and the fluorine ion amount (µg) were measured by the ion chromatography. Then, by dividing the nitrate ion amount and the fluorine ion amount by the filling void volume of the polycrystalline silicon lump packaging body, the amount (µg/L) of each ions with respect to the filling void was obtained. The filling void volume (L) of the filled polycrystalline silicon lump packaging body was obtained by calculating the volume of the filled polycrystalline silicon lump by dividing the weight of the filled polycrystalline silicon lump by the density of polycrystalline silicon of 2330 $kg/m^3$, and then subtracting the volume of the polycrystalline silicon lumps from the internal volume (L) of the resin bag forming the packaging body at 25° C. under 1 atm.

4) Stain Occurrence Test for Polycrystalline Silicon Lump Filled in Polycrystalline Silicon Lump Packaging Body In order to promote the occurrence of the stains, the polycrystalline silicon lump packaging bodies (resin bags each having a volume of 3.5 L filled with approximately 5 kg of the polycrystalline silicon lump) produced in Examples and Comparative Examples were stored in a high temperature and high humidity tank having a temperature of 70° C. and a humidity of 90% for 7 days. After that, the packaging bodies were opened, and the surface of each polycrystalline silicon lump was observed to confirm the occurrence of the stains. A stain occurrence rate represented by the following equation was calculated and evaluated according to the following criteria.

Stain occurrence rate=number of polycrystalline silicon lumps with stains/total number of polycrystalline silicon lumps in packaging body×100

A: stain occurrence rate is 0%
B: stain occurrence rate is more than 0% and 1% or less
C: stain occurrence rate is more than 1% and 3% or less
D: stain occurrence rate is more than 3%

All of the polycrystalline silicon lumps before filled in these packaging bodies had no stains on the surface (the stain occurrence rate was 0%) by visual observation.

Example 1

The polycrystalline silicon lump (90 mass % or more of the lump had a particle size in which the major axis length was in the range of 10 mm to 60 mm) obtained by crushing the polycrystalline silicon rod produced by the Siemens method with a crushing tool was housed in a cleaning cage and immersed in an acid cleaning tank containing a 20° C. aqueous solution of nitrohydrofluoric acid (containing 8 parts by mass of hydrogen fluoride and 215 parts by mass of nitric acid with respect to 100 parts by mass of water) for 10 minutes for an etching treatment, and further immersed in a water-washing tank (20° C.) for 10 minutes. The obtained polycrystalline silicon lump cleaned body was housed in a heating furnace and dried at 100° C. for 30 minutes with air supplied at 100° C. The surface metal concentration of the dried polycrystalline silicon lump was measured and found to be 80 pptw. The surface nitrate ion amount and the surface fluorine ion amount were also measured. Results are shown in Table 1. The surface thereof was visually observed, and it was confirmed that no stains occurred.

A polyethylene resin bag having a volume of 3.5 L was filled with approximately 5 kg of the cleaned polycrystalline silicon lumps obtained as described above (filling void rate was 50%, the number of the lumps was approximately 500) to produce the polycrystalline silicon lump packaging body. This polycrystalline silicon lump packaging body was subjected to the stain occurrence test on the polycrystalline silicon lump filled, and ease of stain occurrence was evaluated. Results are shown in Table 1.

Example 2

A polycrystalline silicon lump packaging body was prepared in the same manner as in Example 1 except that the heating temperature in the heating furnace in which the polycrystalline silicon lump cleaned body was housed was increased to 120° C. and the drying time was extended to 60 minutes. The obtained polycrystalline silicon lump packaging body was subjected to the stain occurrence test on the polycrystalline silicon lump filled, and the ease of stain occurrence was evaluated. Results are also shown in Table 1.

Comparative Example 1

A polycrystalline silicon lump packaging body was prepared in the same manner as in Example 1 except that the heating temperature in the heating furnace in which the polycrystalline silicon lump cleaned body was housed was lowered to 80° C. The obtained polycrystalline silicon lump packaging body was subjected to the stain occurrence test on the polycrystalline silicon lump filled, and the ease of stain occurrence was evaluated. Results are also shown in Table 1.

Comparative Example 2

A polycrystalline silicon lump packaging body was prepared in the same manner as in Example 1 except that the heating temperature in the heating furnace in which the polycrystalline silicon lump cleaned body was housed was lowered to 80° C. and the drying time was extended to 60 minutes. The obtained polycrystalline silicon lump packaging body was subjected to the stain occurrence test on the polycrystalline silicon lump filled, and the ease of stain occurrence was evaluated. Results are also shown in Table 1.

Comparative Example 3

A polycrystalline silicon lump packaging body was prepared in the same manner as in Example 1 except that the heating temperature in the heating furnace in which the polycrystalline silicon lump cleaned body was housed was lowered to 80° C. and the drying was changed from normal pressure drying to reducing pressure drying (decompression degree: −90 kPa). The obtained polycrystalline silicon lump packaging body was subjected to the stain occurrence test on the polycrystalline silicon lump filled, and the ease of stain occurrence was evaluated. Results are also shown in Table 1.

Comparative Example 4

A polycrystalline silicon lump packaging body was prepared in the same manner as in Example 1 except that the heating temperature in the heating furnace in which the polycrystalline silicon lump cleaned body was housed was lowered to 80° C. and the drying time was extended to 90 minutes. The obtained polycrystalline silicon lump packaging body was subjected to the stain occurrence test on the polycrystalline silicon lump filled, and the ease of stain occurrence was evaluated. Results are also shown in Table 1.

TABLE 1

|  | Example 1 | Example 2 | Comparative Example 1 | Comparative Example 2 | Comparative Example 3 | Comparative Example 4 |
|---|---|---|---|---|---|---|
| Heating temperature (° C.) | 100 | 120 | 80 | 80 | 80* | 80 |
| Drying time (min) | 30 | 60 | 30 | 60 | 30 | 90 |
| Surface nitrate ion amount ($\mu g/mm^2$) of polycrystalline silicon lump | $1.0 \times 10^{-4}$ | $1.0 \times 10^{-5}$ | $5.2 \times 10^{-4}$ | $2.1 \times 10^{-4}$ | $1.0 \times 10^{-3}$ | $1.4 \times 10^{-5}$ |
| Surface fluorine ion amount ($\mu g/mm^2$) of polycrystalline silicone lump | $1.0 \times 10^{-4}$ | $4.0 \times 10^{-5}$ | $1.0 \times 10^{-4}$ | $1.0 \times 10^{-4}$ | $2.0 \times 10^{-5}$ | $4.9 \times 10^{-5}$ |
| Nitrate ion amount ($\mu g/L$) present inside polycrystalline silicone lump packaging body | 50 | 5 | 250 | 100 | 500 | 70 |
| Fluorine ion amount ($\mu g/L$) present inside polycrystalline silicone lump packaging body | 50 | 20 | 50 | 50 | 10 | 25 |
| Stain occurence evaluation | B | A | D | C | D | C |

*In Comparative Example 3, reducing pressure drying was performed under a decompression degree of −90 kPa.

The invention claimed is:

1. A polycrystalline silicon lump packaging body, comprising:
   a resin bag is filled with polycrystalline silicon lumps,
   wherein a nitrate ion amount present inside the packaging body is 1 μg/L to 5 μg/L with respect to a filling void of the polycrystalline silicon lumps formed when the packaging body is left at 25° C. under 1 atm, and
   wherein the polycrystalline silicon lumps comprise a crushed product, wherein at least 90 mass % of the crushed product has a major axis length in a range of 2 mm to 160 mm.

2. The polycrystalline silicon lump packaging body according to claim 1, wherein a fluorine ion amount present inside the packaging body is 30 μg/L or less with respect to the filling void of the polycrystalline silicon lumps formed when the packaging body is left at 25° C. under 1 atm.

3. The polycrystalline silicon lump packaging body according to claim 1, wherein the resin bag is filled with polycrystalline silicon lumps having a surface metal concentration of 100 pptw or less and a surface nitrate ion amount of $1.0 \times 10^{-5}$ μg/mm² or less.

4. The polycrystalline silicon lump packaging body according to claim 3, wherein a fluorine ion amount present on a surface of the polycrystalline silicon lumps is $6.0 \times 10^{-5}$ μg/mm² or less.

5. The polycrystalline silicon lump packaging body according to claim 1, wherein a filling void rate of the resin bag filled with the polycrystalline silicon lumps is 40% to 70%.

6. The polycrystalline silicon lump packaging body according to claim 1, wherein a filling void rate of the resin bag filled with the polycrystalline silicon lumps is 40% to 50%.

7. The polycrystalline silicon lump packaging body according to claim 1, wherein the number of polycrystalline silicon lumps is approximately 500.

8. A method for producing the polycrystalline silicon lump packaging body according to claim 1, comprising:
   water washing in a tank at a temperature of 80° C. or more, polycrystalline lumps cleaned body acid-cleaned with an aqueous solution of nitrohydrofluoric acid;
   drying, at a heating temperature of 120° C. to 150° C. for 30 minutes to 120 minutes in a cage made of a resin after said water washing, wherein the polycrystalline silicon lumps have a surface metal concentration of 100 pptw or less and a surface nitrate ion amount of $1.0 \times 10^{-5}$ μg/mm² or less; and
   packing the polycrystalline silicon lumps in the resin bag.

9. A method for producing a polycrystalline silicon lump packaging body according to claim 8, wherein said drying is for 30 minutes to 60 minutes.

10. A method for producing a polycrystalline silicon lump packaging body according to claim 8, wherein said drying is for 60 minutes to 120 minutes.

11. A polycrystalline silicon lump packaging body comprising:
   a resin bag is filled with polycrystalline silicon lumps,
   wherein the polycrystalline silicon lump comprises a crushed product, wherein at least 90 mass % of the crushed product has a major axis length in a range of 2 mm to 160 mm, and
   wherein a fluorine ion amount present inside the packaging body is 15 μg/L to 30 μg/L with respect to the filling void of the polycrystalline silicon lumps formed when the packaging body is left at 25° C. under 1 atm.

* * * * *